United States Patent [19]

Rounds

[11] 3,933,994

[45] Jan. 20, 1976

[54] PROCESS FOR DESULFURIZING GASES

[75] Inventor: Gerald L. Rounds, Fontana, Calif.

[73] Assignee: Kaiser Steel Corporation, Fontana, Calif.

[22] Filed: Mar. 20, 1974

[21] Appl. No.: 452,988

[52] U.S. Cl.................................. 423/575; 423/222
[51] Int. Cl.² ........................................ C01B 17/04
[58] Field of Search ............ 423/575, 574, 243, 222

[56] References Cited
UNITED STATES PATENTS

| | | | |
|---|---|---|---|
| 515,084 | 2/1894 | Iles................................... | 423/215.5 |
| 925,751 | 6/1909 | Carpenter........................... | 423/244 |
| 2,031,802 | 2/1936 | Tyrer................................. | 423/243 |
| 2,729,543 | 1/1956 | Keller................................ | 423/575 |

*Primary Examiner*—G. O. Peters
*Attorney, Agent, or Firm*—Bruno J. Verbeck

[57] ABSTRACT

A desulfurizing process wherein a gas stream containing $SO_2$ is contacted with a citric acid or citrate-containing solution, and a gas stream containing $H_2S$ is contacted with the resulting solution, whereby elemental sulfur is precipitated and removed. The rate of flow of the respective gases contacting the aforesaid solution is such that the amount of $H_2S$ and $SO_2$ contained in the solution after said solution has been contacted with the gas streams is substantially in the ratio of two mols of $H_2S$ to one mol of $SO_2$. A portion at least of the solution from which elemental sulfur is removed is passed to the first step of the process, for contacting the gas stream containing $SO_2$.

2 Claims, 1 Drawing Figure

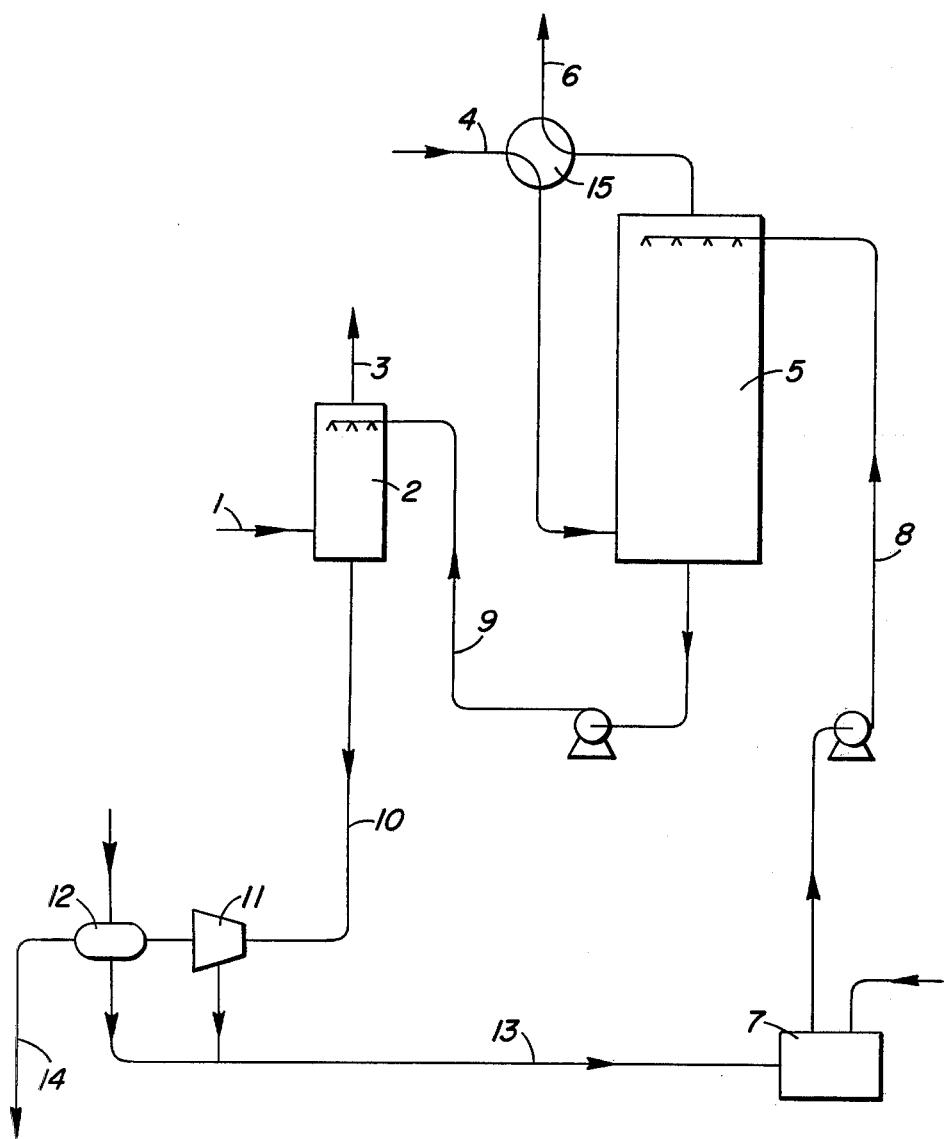

PROCESS FOR DESULFURIZING GASES

BACKGROUND OF THE INVENTION

This invention relates to a process for desulfurizing a gas stream having an $H_2S$ content and a gas stream having an $SO_2$ content. More specifically, the invention relates to a process for desulfurizing an industrial waste gas such as coke oven gas by contacting it with a citric acid or citrate-containing solution which has been contacted with an $SO_2$—containing gas such as sinter plant gas from an integrated steel mill. Sulfur is precipitated in the solution, and is removed therefrom. The gases from which a significant sulfur content has been removed can be re-used or passed to the atmosphere.

In the operation of an integrated steel mill, the sulfur content of coke oven exhaust and sinter plant gas pose a serious air pollution problem. Treatment procedures suggested in the past to significantly reduce the sulfur content of such gases have been either too inefficient or costly or both.

SUMMARY OF THE INVENTION

It is a principal object of the present invention to provide a process for substantially lowering the sulfur content of industrial gases. A further object is to provide a process for efficiently desulfurizing gas streams containing a sulfur content in the form of $SO_2$. Another object is to provide a process for effectively desulfurizing gas streams having a sulfur content in the form of $H_2S$. A still further object is to provide a process for removing sulfur from sinter plant gas and from coke oven gas produced during operation of an integrated steel mill. Further objects will be obvious to those skilled in the art as the disclosure continues hereafter.

While the following disclosure is set forth specifically with respect to the treatment of sulfur-containing gases produced in operating an integrated steel mill, it will be apparent to those skilled in the art that it is equally applicable to the treatment of similar sulfur-containing gases produced during other industrial processes and accordingly the following disclosures, teachings and examples are to be considered illustrative rather than limiting.

In carrying out the instant process, sinter plant gases containing $SO_2$ are scrubbed into a citrate solution and the waste, $SO_2$-free gases are discharged into the atmosphere, or may be utilized further if desired. A further description of desulfurization of sulfur-containing gases by contacting them with citrate-containing solutions may be found in "Sulfur dioxide emission control by hydrogen sulfide reaction in aqueous solution: the citrate system," by J. B. Rosenbaum (and others. Washington) U.S. Bureau of Mines (1973).

The $SO_2$—bearing solution from the aforesaid scrubbing is then pumped to a second scrubber in which coke oven gas containing $H_2S$ is washed free of its $H_2S$. The reaction of $H_2S$ and $SO_2$, both of which are present in the twice-used solution form elemental sulfur ($S^o$) by the well-known Claus Reaction. The $S^o$ forms a fine suspended solid in the solution, in the second scrubbing step.

The $S^o$ is then removed from the scrubbing solution by any suitable solids removed process, as by centrifuging or filtering, followed by a step in which the $S^o$ is melted and freed of occluded scrubbing solution.

The freed scrubbing solution is then pumped back to a holding tank in which the acidity is readjusted to bring the solution into the desired pH range. A small amount of sodium thiosulfate is added to the solution to prevent oxidation of $SO_2$ to $SO_3$. After the solution has been adjusted in this way, it is ready to be pumped to the sinter plant scrubber for its next pass through the cycle.

It is important that the scrubbing solution be kept as clean as practicable in order to produce clean $S^o$. For this reason, the coke oven gas - or other $H_2S$-rich gas used — must first be cleaned of tars and the like in accordance with well-known procedures used in coke oven by-product practice.

The sinter plant exhaust gas can be cleaned either by use of bag filtration or by high energy water scrubbing. The latter has the disadvantage of high energy costs due to the high pressure drops through orifice or venturi scrubbers required to achieve good particulate removal. Baghouse filtration, though costly through capital expenditures, has lower operating costs and fits well into a gas scrubbing operation.

While either system may be used for sinter plant gas particulate removal in the present process, an added advantage is obtained through use of a baghouse filtration system. That advantage comes about through an increase in the buoyancy of the exhaust gases after scrubbing, by reheating, using a gas to gas heat exchanger which involves removing heat from the gases from the baghouse before scrubbing. After scrubbing the extracted heat is added back to the gases before discharging, as into a stack, thus imparting stack gas velocity and buoyancy to produce better dispersion of the effluent waste gas. Furthermore there will be a less objectionable steam plume and attendant and rain-out in the stack local.

In my process a scrubbing efficiency of 85% for the sinter plant $SO_2$ and 70 to 80% for the coke oven $H_2S$ will produce about 500 pounds per hour of elemental sulfur from a steel mill with 3 million ingot ton capacity per year.

BRIEF DESCRIPTION OF THE DRAWING

Referring now to the drawing, coke oven gas, free of the remaining constituents of coke oven gas which have been removed by any known byproducts separation system, containing 223 $Sm^3$ $hr.^{-1}$ (standard cubic meters per hour) of $H_2S$ and approximately an equal volume of $CO_2$ is conveyed through line 1 into $H_2S$ scrubber 2. If only the ammonia, light oil and tar has been removed by the by-products separation system (which is the procedure followed in some steel mill coke oven plants) then the quantity of gas to be handled would increase from 223 $Sm^3$ $hr.^{-1}$ to 84,960 $Sm^3hr.^{-1}$. With either system, the gas volume to liquid rate is controlled by the waste gas scrubber removing $SO_2$ from such combustion products. In the present process, 1,260 liters per minute of citrate solution is contacting the $H_2S$-containing gas. The gas, passing through the scrubber 2 is scrubbed with a citrate-containing solution also containing $SO_2$, and is discharged at 3. The discharged gas can be handled in a number of ways, depending on the need for fuel, amount of contaminants in the gas, availability of combustion flaring equipment, local air pollution rules, and the like. In many steel plants this gas will contain less than 0.9 gm $m^{-1}H_2S$, the original gas containing about 3 3/4 gm $m^{-1}$ of $H_2S$. Because of the B.T.U. value of the gas containing less than 0.9 gm $m^{-1}$ of $H_2S$ it will often be profitable to return it to the original coke oven gas mains for use as a fuel. Furthermore, combustion of the $H_2S$ converts it to $SO_2$ which has less environmental impact than $H_2S$.

In the scrubber 2 elemental sulfur is produced in accordance with the following reaction.

$$2H_2S + SO_2 = 3S + 2H_2O$$

The sulfur, in the form of a suspension in the citrate solution is conveyed through line 10 to a centrifuge 11. The liquid from the centrifuge 11 is returned to the citrate makeup tank 7 through line 13. The sulfur is further refined by melting with steam or other heat source in a melter 12, leaves the melter 12 through line 14 and is either case or handled further in a molten state as desired.

Because sinter plant gas (or other $SO_2$—containing gas) is usually a waste gas from a combustion process, it is characterized by large flow rates and requires discharge from a tall stack for proper dispersion. For these reasons the gas containing $SO_2$, such as sinter plant gas, is first conveyed from its source through line 4 to a heat exchanger 15 where heat is extracted from the gas, for future return to it in order to achieve better dispersion upon atmospheric discharge. The heat exchanger can be one of several in common usage, such as a rotary heat sink, brick checker work, and the like. After being cooled in heat exchanger 15, the gas is conveyed into $SO_2$ scrubber 5 where it is contacted by a buffered citrate solution which has been conveyed from tank 7 through line 8.

The exhausting of gases after the $H_2S$ or $SO_2$ has been removed can be accomplished safely if the gases are not combustible or contain no toxic materials. However, in most processes such an ideal situation does not exist and the exhaust gases after $SO_2$ and/or $H_2S$ removal, will of necessity be discharged into a main for further processing, as for use as a fuel, or in the case of an atmospheric discharge be discharged from a stack. If the gas is discharged from a stack, reheating the gas results in greater buoyancy and gas velocity at the point of atmospheric discharge. Reheating can be effected in various ways using combustion, or as in the presently preferred way, by adding the heat extracted by a heat exchanger, prior to scrubbing. That is to say, in my preferred method, the heat is removed so that the gas is at a predetermined temperature prior to the scrubbing by the citrate solution, and the same returned to the gas after such scrubbing.

Increasing the stack gas discharge temperature from 50 to 100° C increases the effective stack height by increasing the discharge velocity, which increases the momentum of the gas, as well as the buoyancy of the gas due to its lower density relative to the atmospheric air density. These factors, momentum and buoyancy, when increased, permit the exhaust gas to diffuse to a greater degree before it reaches the ground.

This diffusion effect can be seen by a further consideration of a stack gas (unheated) discharged at 50° C, and a stack gas (heated) discharged at 100° C. Because there is an increase in the effective stack height of approximately 1⅓ meters for each centigrade degree of stack gas temperature rise, and because the effective stack height is in the exponent of the usual diffusion equations, this increase of 50° C decreases the concentration of stack gas pollutants at the point of ground contact by a factor of 4.

Because the $SO_2$-containing gas has the greater volume of the two gases involved in the instant process, it is the one controlling the amount of citrate solution per volume of gas. A desirable and preferred ratio is about 5¼ $m^3 l^{-1}$ (cubic meters per liter). This ratio can be used due to the great affinity $SO_2$ has for the suggested citrate solution.

After gas to liquid scrubbing has taken place, the gas which originally contained about 1.35 gm $m^{-3}$ (grams per cubic meter) of $SO_2$ and now contains about 0.78 gm $m^{-3}$, is discharged back through heat exchanger 15 and out a tall stack through line 6.

After the citrate solution has picked up the $SO_2$ from scrubber 5 it is pumped to scrubber 2 through line 9 so that $H_2S$ can be absorbed and elemental sulfur in accordance with the aforesaid chemical reaction.

The citrate solution is made up in tank 7 by the addition of citric acid, sodium hydroxide and sodium thiosulfate in accordance with the method set out hereinbefore described Bureau of Mines publication. In order to prevent decomposition of the sodium thiosulfate it should be added to tank 7 after the citric acid and sodium hydroxide have formed an acid buffer and the pH has risen to a pH of about 5 from the pH of about 1 of the citric acid solution.

If either the $SO_2$—containing gas or the $H_2S$—containing gas has other impurities which are scrubbed out by either scrubber 2 or scrubber 5 the concentration of these impurities could build up in the citrate solution. In such event a suitable continuous, or intermittant discharge may be required from the citrate tank or other suitable place in the system in order to maintain the concentration of such impurities in the citrate solution below the concentration at which interference with the $H_2S$—$SO_2$ reaction might occur. Such impurities may be, for example, sodium sulfate, calcium sulfate, sodium chloride, calcium chloride, tar, light oil, benzene and tuluol.

The production of particulates with the gas emission frequently occurs in the $SO_2$—producing process. If large quantities of particulates are involved, the citrate solution will become contaminated with a sludge. To minimize or prevent this, particulate recovery devices normally required by local air pollution regulations suffice. One such device successfully operated on a sinter plant is a baghouse. Baghouses, which are common to the gas cleaning industry operate on a filtration principle, the dirty gas being forced or drawn through a porous fabric.

The $SO_2$—producing process usually emits alkali-containing dust and since no dust remover is totally efficient, the remaining alkali will reduce the amount of sodium hydroxide needed to be added to the citrate solution. It is also to be pointed out that the pH of the citrate solution is low enough to prevent the precipitation of calcium sulfide, by the formation of acid sulfide ion in accordance with the following reaction:

$$CaS + H^+ = Ca^{++} + HS^-$$

Sodium and potassium alkali do not pose a problem because their solutilities are greater than that of calcium.

Calcium citrate is sufficiently soluble to prevent precipitation at the operating pH of about 5. This solubility results in the calcium citrate entering into a buffering reaction with the sodium hydroxide in the citrate solution.

Self-fluxing sinter, i.e. sinter containing calcium oxide, used in many steel mills, produces an off-gas which may be used in the instant process, if means for controlling particulates are installed.

Industrial exhaust gas temperatures of processes emitting $SO_2$ are usually in the range of 120°–480° C, and accordingly it is necessary to cool the gas before contacting it with the citrate solution, which latter is preferably maintained at about 45°–50° C. Cooling of the $SO_2$ laden gas can be effected in any conventional way as by water injection, use of heat exchangers, or by passing the gas through a scrubber or hurdle using water as the cooling agent.

The temperature of the $H_2S$ bearing gas, such as coke oven gas, is normally sufficiently low due to cooling by the upstream by-product plant that additional cooling is not needed. Thus, for example, the temperature of coke oven gas after by-product removal is approximately 35° C. If the $H_2S$-containing gas is hotter than the desired 45°–50° C, it too can be cooled by customary procedures as already discussed.

I claim:

1. A continuous process for desulfurizing the coke oven gas and sinter plant gas resulting from operation of an integrated steel mill and forming elemental sulfur which comprises,
    a. conveying a stream of sinter plant gas from its source to a heat exchanger to extract heat from said gas;
    b. contacting the cooled stream of sinter plant gas with a citric acid-containing solution to reduce the $SO_2$ content of said stream and increase the $SO_2$ content of said solution;
    c. returning the resulting stream of gas to the said heat exchanger to return heat thereto;
    d. discharging the resulting gas of increased temperature into a stack;
    e. contacting a stream of coke oven gas free of by-product constituents with the solution resulting from step b) to reduce the $H_2S$ content of said coke oven gas stream and increase the $H_2S$ content of said solution;
    f. the relative rates of flow of the two said gas streams being such that the amount of $H_2S$ and $SO_2$ contained in the solution resulting from step e) is substantially in the ratio of two moles of $H_2S$ to one mole of $SO_2$, whereby elemental sulfur precipitates out of the solution;
    g. removing precipitated sulfur from the last said solution, and
    h. passing at least a portion of the solution resulting from step f) to step a).

2. The process of claim 1 wherein the said gases, after their sulfur contents have been lowered, are discharged from the citric acid containing solution at a temperature of about 50°C, and then reheated to about 100°C.

* * * * *